(12) United States Patent
Greenwood

(10) Patent No.: US 7,530,916 B2
(45) Date of Patent: May 12, 2009

(54) CONTINUOUSLY VARIABLE RATIO TRANSMISSION SYSTEM

(75) Inventor: Christopher John Greenwood, Preston (GB)

(73) Assignee: Torotrak (Development) Limited, Lancashire (GB)

( * ) Notice: Subject to any disclaimer, the term of this patent is extended or adjusted under 35 U.S.C. 154(b) by 308 days.

(21) Appl. No.: 10/561,727

(22) PCT Filed: Jul. 1, 2004

(86) PCT No.: PCT/GB2004/002841

§ 371 (c)(1),
(2), (4) Date: Jul. 6, 2006

(87) PCT Pub. No.: WO2005/003597

PCT Pub. Date: Jan. 13, 2005

(65) Prior Publication Data

US 2007/0042856 A1 Feb. 22, 2007

(30) Foreign Application Priority Data

Jul. 1, 2003 (GB) ................................ 0315408.5

(51) Int. Cl.
*F16H 37/08* (2006.01)
(52) U.S. Cl. ...................................... 475/216; 475/218
(58) Field of Classification Search .......... 475/214–219
See application file for complete search history.

(56) References Cited

U.S. PATENT DOCUMENTS 6,155,951 A * 12/2000 Kuhn et al. .................. 475/216

2002/0169048 A1 11/2002 Henzler et al.
2006/0142110 A1 * 6/2006 Greenwood et al. ......... 475/214

FOREIGN PATENT DOCUMENTS

| EP | 1 026 424 A2 | 8/2000 |
| EP | 1026424 A2 | 9/2002 |

OTHER PUBLICATIONS

International Preliminary Report on Patentability dated Jan. 3, 2006 for International application No. PCT/GB2004/002841, filed Jul. 1, 2004, Applicant: Torotrak (Development) Ltd., 6 pages.
PCT International Search Report. Int'l Appln. No. PCT/GB2004/002841; Int'l filing date: Jul. 1, 2004.
PCT Written Opinion Of the International Searching Authority; Int'l Appln. No. PCT/B2004/002841; Int'l filing date: Jul. 1, 2004.

* cited by examiner

*Primary Examiner*—David D Le
*Assistant Examiner*—Derek D Knight
(74) *Attorney, Agent, or Firm*—Brooks Kushman P.C.

(57) ABSTRACT

A multiple-regime continuously variable ratio transmission system has a system input shaft (I), a system output shaft (0) and a continuously variable ratio transmission unit (variator) connected to the system input shaft and having a variator output shaft. A first mixing epicyclec gear train (P1) having inputs drivably connected to the variator output shaft (V) and the system input shaft via a first clutch (H) and a second mixing epicyclic gear train having inputs drivably connected to the variator output shaft and the system input shaft has an output (28) connected to a third epicyclic gear train (E2) having an output which is selectively connectable to the to the system output shaft via a first braking element (L). A second braking element (B) is adapted to lock the output (28) of the second mixing epicyclic gear train in a stationary position.

8 Claims, 2 Drawing Sheets

CONTINUOUSLY VARIABLE RATIO TRANSMISSION SYSTEM

BACKGROUND OF THE INVENTION

1. Field of the Invention

The present invention relates to continuously variable ratio transmission systems.

2. Background Art

It is known to provide a continuously variable ratio transmission system having system input and output shafts and a continuously variable ratio transmission unit (known as a variator) connected to the system input shaft and having a variator output shaft. A mixing epicyclic gear train receives drive from the system input and from the variator input. By appropriate use of clutches or other braking elements, the system can operate in a high-gearing regime or a low-gearing regime. Examples of such transmissions, which disclose arrangements having coaxial system input and output shafts, can be found in JP-A-6-174033 and JP-A-62-255655.

Inevitably, small power losses arise from the intermeshing of gears. In order to maximise efficiency, it is therefore desirable to reduce the number of gear meshes, particularly in the mixing epicyclic gear train where the power losses can be effectively be magnified during operation in a "power recirculation" mode.

Our co-pending United Kingdom patent application 0212186.1 addresses this problem by providing a mixing epicyclic gear train having an input sun gear drivably connected to the variator output shaft, a planet carrier drivably connected to the system input shaft and a first planet gear mounted on the planet carrier and drivingly engaged with the input sun gear. The first planet gear drives a first intermediate output shaft arranged coaxially with the system input shaft and is selectively connectable to the system output shaft via a first clutch. In addition, the first planet gear provides the input for a second epicyclic gear train having an output which is selectively connectable to the system output shaft via a braking element.

SUMMARY OF THE INVENTION

The variator is the lowest efficiency component of the transmission but it enables engine optimisation by ratio matching, resulting in improved overall economy. However, this is not possible at maximum power since this occurs only at one engine speed. If power loss is important, it may be beneficial to sacrifice variable ratio for best efficiency by removing the influence of the variator and operating it at a fixed ratio.

The overall result is to potentially avoid a slight reduction in the top speed of the vehicle to which the transmission is fitted.

In accordance with a first aspect of the present invention there is provided a multi-regime, continuously variable ratio transmission system, comprising:

a system input shaft and a system output shaft;

a continuously variable ratio transmission unit (variator) connected to the system input shaft and having a variator output shaft;

an output from the variator which is selectively connectable to the system output shaft via a first clutch;

a mixing epicyclic gear train having inputs drivably connected to the variator output shaft and the system input shaft and having an output which is selectively connectable to the system output shaft via a first braking element; and a second braking element adapted to lock the output of the mixing epicyclic gear train in a stationary position.

Preferably the system input shaft, the system output shaft and the variator are arranged coaxially with each other and with a second epicyclic gear train comprising a second input sun gear driven by the output of the mixing epicyclic gear train and wherein the second braking element is adapted to selectively lock the input sun gear of the second epicyclic gear train in a stationary position.

Preferably the transmission system comprises intermediate gearing connecting the mixing epicyclic gear train and the input sun gear of the second epicyclic gear train.

Preferably the second epicyclic gear train comprises a second sun gear engaged with a planet gear.

Preferably the sun gear is held stationary with respect to the transmission casing and the first braking element comprises clutch means for selectively connecting the output of the second epicyclic gear train to the system output shaft.

In accordance with a second asepct of the present invention a method of operating a transmission system as claimed in any of the preceding claims, comprises:

detecting a condition in which the output from the variator is connected to the system output shaft via the first clutch and in which the mixing epicyclic gear train output is substantially stationary; and applying the second braking element to lock the output of the mixing epicyclic gear train in the stationary position.

BRIEF DESCRIPTION OF THE DRAWINGS

By way of example only, a specific embodiment of the present invention will now be described, with reference to the accompanying drawings, in which.

DETAILED DESCRIPTION OF THE PREFERRED EMBODIMENTS

Figure 1:
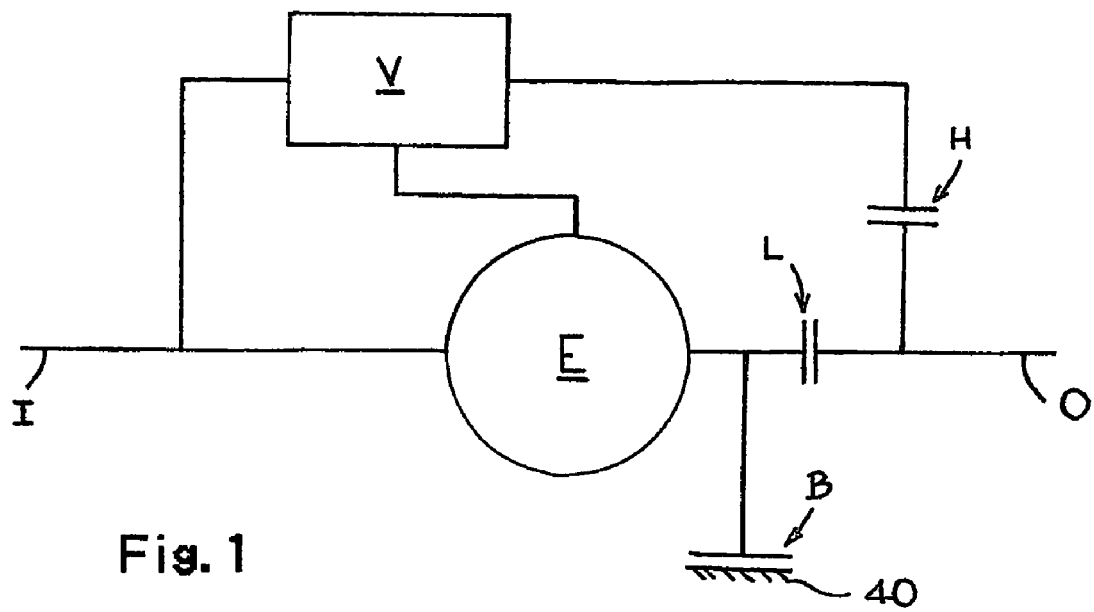
FIG. 1 is an illustration showing the general principle of the present invention.

Referring firstly to FIG. 1, an infinitely variable ratio transmission system comprises a transmission input shaft I and a transmission output shaft O. Connected between the system input shaft I and the system output shaft O is a variator V, preferably of the known toroidal race roller traction type, and a high regime clutch H. The transmission input shaft I and the output of the variator V are also connected to a mixing epicyclic gear set E, the output of which is selectively connectable to the transmission output shaft O by means of a low regime clutch L.

However, it will also be observed that the output of the epicyclic gear set E can also be locked to the transmission casing 40 by means of a further braking element in the form of clutch B.

One feature of the output of the mixing epicyclic gear set E is that at a certain variator ratio the output of the epicyclic gear set E is stationary (a condition which, when the transmission is in low regime, is known in the art as "geared neutral"). The general principle of the present invention is that, with the high regime clutch H engaged and the low regime clutch L disengaged (i.e. with the transmission in high regime) the output of the epicyclic gear set E is continuously sensed and, when the output of the epicyclic gear set E is zero (or close to zero) the additional clutch B is engaged, which locks the output of the epicyclic gear set at zero rotation. Locking clutch B prevents the variator from moving away from the ratio which would result in geared neutral if the low-regime clutch were engaged.

Figure 2:
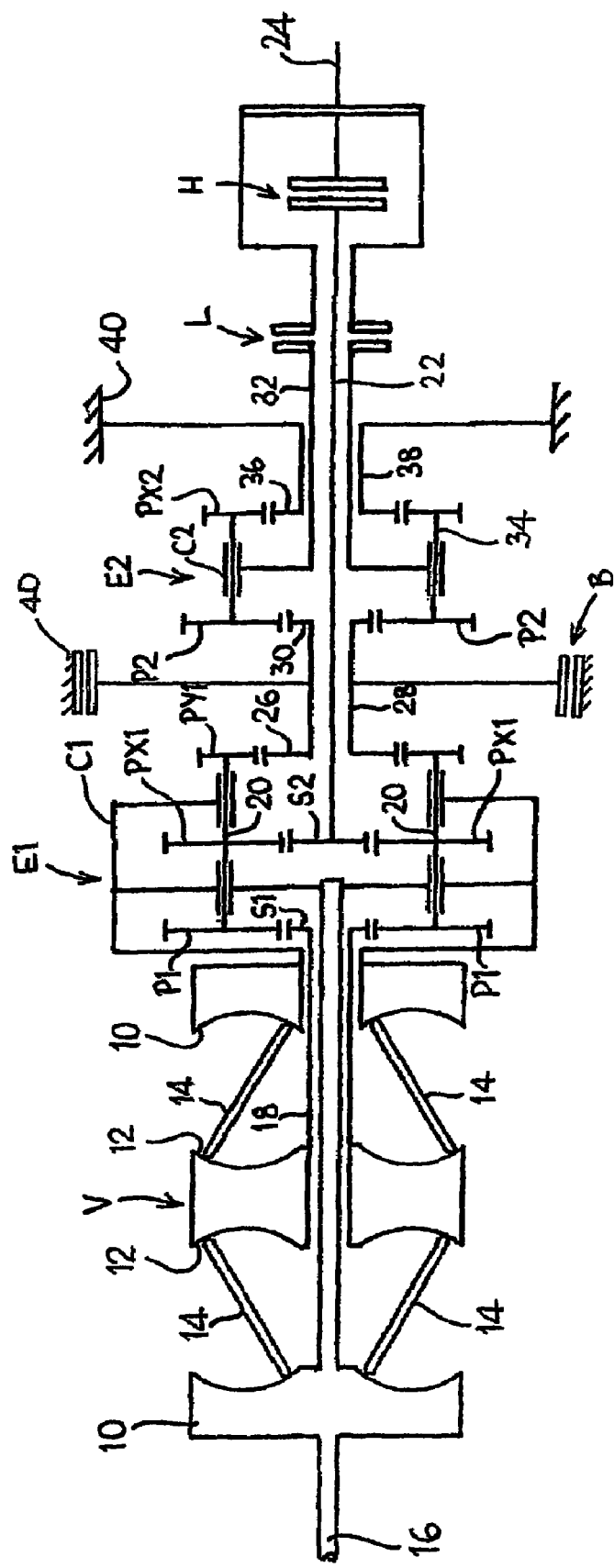
FIG. 2 is a schematic diagram of an embodiment of transmission in accordance with the present invention.

The arrangement of FIG. 2 illustrates one embodiment of the present invention in more detail.

A continuously variable ratio transmission system comprises a variator V of the known toroidal race rolling traction type having two toroidally-recessed discs 10 arranged one at each end of the unit and a pair of similar output discs 12, each facing a respective one of the input discs 10 and rotating with each other. Sets of rollers 14 are mounted between the opposing faces of the input and output discs 10, 12 to transmit drive from the input discs 10 to the output discs 12 with a ratio which is variable by tilting the rollers 14.

The input discs 10 are connected to and driven by a system input shaft 16. The variator provides an output via a tubular variator output shaft 18 which is arranged coaxially with the input shaft 16. The end of the shaft 18 remote from the variator V drives the sun gear S1 of a first, mixing epicyclic gear train E1. The carrier C1 of the gear train E1 is connected to, and driven by, the input shaft 16 and is also connected to the inner of the two variator input discs 10. The carrier C1 carries input planet gears P1 which engage with, and are driven by, the sun gear S1. The planet gears P1 are each mounted on the carrier C1 by means of an associated shaft 20 which additionally carries first and second output planet gears PX1 and PY1. Output planet gear PX1 is identical to planet gear P1 and transfers the summed output of the gear train E1 via an output sun gear S2 (of the same size as input sun gear S1) to an intermediate output shaft 22 arranged coaxially with the system input shaft 16. Drive from the intermediate output shaft can be selectively transmitted via a high-regime clutch H to a system output shaft 24.

Output planet gear PY1 is of smaller diameter than planet gears P1 and PX1 and meshes with a pinion 26 formed on one end of a tubular intermediate output shaft 28 arranged coaxially with the input shaft 16. The opposite end of the intermediate output shaft is also provided with a pinion 30 of smaller diameter than pinion 26. The pinion 30 meshes with larger diameter planet gears P2 of a second, simple reversing epicyclic gear set D2. The planet gears P2 are mounted on a carrier C2 which is connected to a second tubular intermediate output shaft 32 arranged coaxially with the system input shaft 16, and which in turn is connected to the system output shaft 24.

The planet gears P2 of the second epicyclic gear set E2 are each located at one end of a respective shaft 34 mounted in the carrier C2. The opposite end of each shaft 34 carries a further, smaller planet gear PX2 which mesh with a sun gear 36 which is fixedly connected to the transmission casing 40. Drive from the second tubular intermediate output shaft 32 is taken continuously from the carrier C2 and is selectively connected to the system output shaft 24 by means of a low-regime clutch L.

In addition, it will be observed that the tubular intermediate output shaft 28 can be selectively braked to the transmission casing 40 by means of the additional clutch B referred to above.

The transmission can operate in one of three regimes, namely high regime, low regime and synchronous mode.

In high regime, the high regime clutch H is engaged and the low regime clutch L is disengaged. This allows the output of a first mixing epicyclic gear train formed by gears PX1 and S2 and carrier C1, which receives inputs from both the input discs 10 and the output discs 12 of the variator V, to be transmitted to the system output shaft 24 from output planet gears PX1 of the first epicyclic gear set E1, the output sun gear S2, the intermediate output shaft 22 and the high regime clutch H.

An output from the other output planet gears PY1 of the first mixing epicyclic gear set E1 is also transmitted to the second epicyclic gear set E2. The output is not transmitted to the carrier C2 in high-regime since the low-regime clutch L is disengaged.

However, as explained previously, for certain conditions of the transmission (known as "geared neutral") the tubular intermediate output shaft 28 (i.e. the second output of the mixing epicyclic gearset E1) does not rotate. The present invention takes advantage of this situation by detecting a geared neutral condition and applying the clutch B to lock the intermediate output shaft 28 to the transmission casing 40 in the condition in which the output of a second mixing epicyclic gear train formed by gears S1, P1, PY1 and 26 and carrier C1 is stationary.

The effect of this is to effectively lock the variator in a fixed ratio corresponding to geared neutral. Power is then transmitted from input shaft 16 at fixed ratio via a first mixing epicyclic gear train formed by carrier C1 and the pairs of gears S2/PX1 and 26/PY1.

In low regime, the high regime clutch H is disengaged and the low regime clutch L is engaged. Disengagement of the high regime clutch H isolates the system output shaft 24 from the output planet gear PX1 of the mixing epicyclic gear set E1. Furthermore, engagement of the low regime clutch L allows the output drive from the first mixing epicyclic gear set E1 to the second epicyclic gear set E2 to be transferred to the carrier C2 of the second epicyclic gear set E2 by providing a reaction force from the transmission casing 40. The drive is then transmitted to the second tubular intermediate output shaft 32 and thence to the system output shaft 24.

Moving from high regime to low regime or vice versa can be achieved in so-called "synchronous mode" in which the transmission operates in a condition in which the intermediate output shaft 22 leading from the mixing epicyclic gear set E1 and the second tubular intermediate output shaft 32 leading from the second epicyclic gear set E2 rotate at (or very near) the same speed. In order to change regime, the clutch of the new regime is engaged, whereby both clutches are simultaneously engaged for a short time and the clutch of the old regime is then disengaged.

It will be observed that in low-regime, the only gears which are actively engaged in the mixing epicyclic gear set E1 are the planetary gears P1 and PY1, thereby minimising the losses which occur in the mixing epicyclic gear train E1, particularly in power recirculation mode. In high regime operation, there are no more meshes than prior art transmissions. However, it should also be noted that the present invention allows the use of a mixing epicyclic gear set E1 which does not have an annulus or ring gear. Not only does this reduce the weight of the transmission, but it also allows greater flexibility with the selection of the relative sizes of planetary gears P1, PX1 and PY1. This in turn allows the speed of the components to be reduced and reduces the number of meshes to a minimum.

The invention is not restricted to the details of the foregoing embodiment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A multi-regime, continuously variable ratio transmission system, comprising:
   a system input shaft and a system output shaft;
   a continuously variable ratio transmission unit (variator) connected to the system input shaft and having a variator output shaft;
   an output from the variator which is selectively connectable to the system output shaft via a first clutch;
   a mixing epicyclic gear train having inputs drivably connected to the variator output shaft and the system input shaft and having an output which is selectively connectable to the system output shaft via a one of a first braking element or a second clutch element; and
   a second braking element adapted to lock the output of the mixing epicyclic gear train in a stationary position.

2. A transmission system as claimed in claim 1, wherein the system input shaft, the system output shaft and the variator are arranged coaxially with each other and with a second epicyclic gear train comprising an input sun gear driven by the output of the mixing epicyclic gear train and wherein the second braking element is adapted to selectively lock the input sun gear of the second epicyclic gear train in a stationary position.

3. A transmission system as claimed in claim 2, comprising intermediate gearing connecting the mixing epicyclic gear train and the input sun gear of the second epicyclic gear train.

4. A transmission system as claimed in claim 2, wherein the second epicyclic gear train comprises a second sun gear engaged with a planet gear.

5. A transmission system as claimed in claim 4, wherein the second sun gear is held stationary with respect to the transmission casing and wherein the first braking element comprises clutch means for selectively connecting the output of the second epicyclic gear train to the system output shaft.

6. A method of operating a transmission system with
   a system input shaft and a system output shaft;
   a continuously variable ratio transmission unit (variator) connected to the system input shaft and having a variator output shaft;
   an output from the variator which is selectively connectable to the system output shaft via a first clutch;
   a mixing epicyclic gear train having inputs drivably connected to the variator output shaft and the system input shaft and having an output which is selectively connectable to the system output shaft via a first braking element or a second clutch element; and
   a second braking element adapted to lock the output of the mixing epicyclic gear train in a stationary position;
   the method comprising:
   detecting a condition in which the output from the variator is connected to the system output shaft via the first clutch and in which the mixing epicyclic gear train output is substantially stationary; and applying the second braking element to lock the output of the mixing epicyclic gear train in the stationary position.

7. A transmission system as claimed in claim 3, wherein the second epicyclic gear train comprises a second sun gear engaged with a planet gear.

8. A transmission system as claimed in claim 7, wherein the second sun gear is held stationary with respect to the transmission casing and wherein the first braking element comprises clutch means for selectively connecting the output of the second epicyclic gear train to the system output shaft.

* * * * *

UNITED STATES PATENT AND TRADEMARK OFFICE
CERTIFICATE OF CORRECTION

PATENT NO. : 7,530,916 B2 Page 1 of 1
APPLICATION NO. : 10/561727
DATED : May 12, 2009
INVENTOR(S) : Christopher John Greenwood It is certified that error appears in the above-identified patent and that said Letters Patent is hereby corrected as shown below:

Column 6, Line 13, Claim 6:

After "via" insert -- one of --.

Signed and Sealed this

Twenty-eighth Day of July, 2009

JOHN DOLL
*Acting Director of the United States Patent and Trademark Office*